May 27, 1969   J. C. BEYNON   3,445,928
MAGNETOMETER METHOD OF MANUFACTURE
Original Filed Feb. 9, 1962  Sheet _1_ of 3
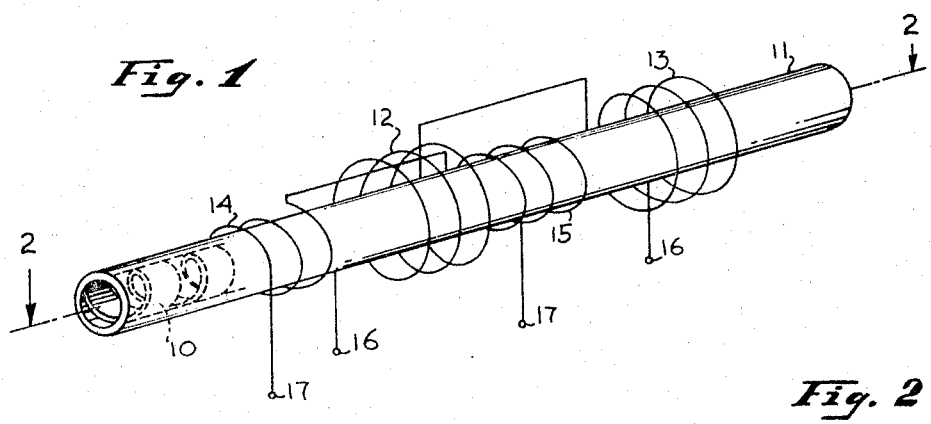
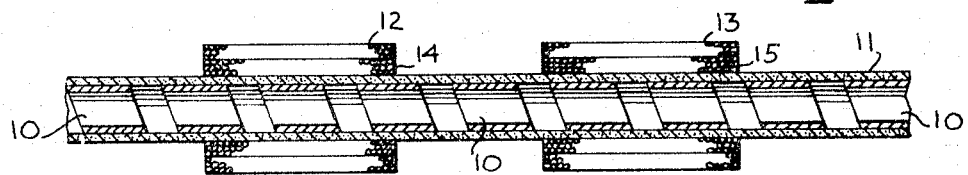
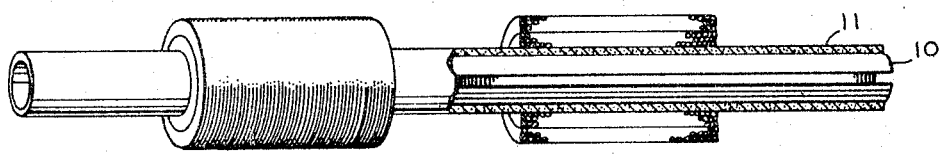
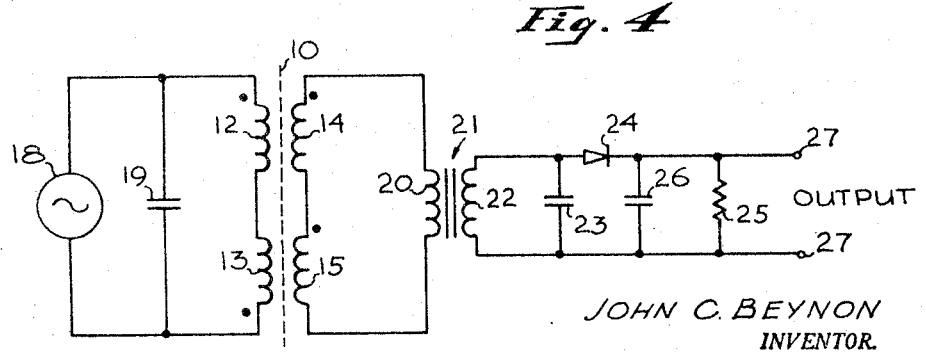
JOHN C. BEYNON
INVENTOR.

JOHN C. BEYNON
INVENTOR.

JOHN C. BEYNON
INVENTOR.

United States Patent Office 3,445,928
Patented May 27, 1969

3,445,928
MAGNETOMETER METHOD OF MANUFACTURE
John C. Beynon, Los Angeles, Calif., assignor to The Bunker-Ramo Corporation, Stamford, Conn., a corporation of Delaware
Original application Feb. 9, 1962, Ser. No. 172,291, now abandoned. Divided and this application Mar. 25, 1966, Ser. No. 538,478
Int. Cl. H01f 41/02
U.S. Cl. 29—606      5 Claims

ABSTRACT OF THE DISCLOSURE

A method of fabricating a magnetometer sensing element which method includes the steps of: (1) forming a thin elongated strip of magnetically saturable material into a resilient helix; (2) disposing said helix within the bore of a hollow cylinder of non-magnetic material so as to permit said helix to expand and resiliently bear outwardly against the inner wall of said cylinder; (3) exposing said cylinder and helix to temperatures sufficient to anneal the material of said helix; and (4) positioning windings on the exterior of said cylinder.

---

This application is a division of U.S. patent application Ser. No. 172,291 filed on Feb. 9, 1962 by John C. Beynon and now abandoned. A continuation of U.S. patent application Ser. No. 172,291 has matured into U.S. Patent No. 3,319,161.

This invention relates to magnetic field sensing devices and more particularly to flux gate magnetometers.

A magnetometer is a well-known instrument used for measuring magnetic fields. The magnetometer may be connected to appropriate means for receiving and utilizing the output signal so produced. For example, magnetometers have been used in prospecting, in mine detectors, in devices for discovering lost bodies such as sunken ships and in various other ways. Basically, a magnetometer comprises an element which is sensitive to the strength or variations in the strength of magnetic fields in conjunction with an arrangement for detecting and amplifying indications provided by the element.

One type of magnetometer, termed a single strip flux gate magnetometer, may utilize a strip of high permeability, magnetically saturable material as the core of the sensing element, a pair of oppositely-wound input windings each associated with a portion of the strip core and connected in series with an alternating-current signal source for driving the strip to provide detectable conditions therein responsive to ambient magnetic fields and a pair of output windings associated with the strip for detecting the aforementioned fields.

The alternating-current input signal applied to the input windings yields an excitation field of such magnitude that the segments of the strip which are directly under the input windings are driven to magnetic saturation over a major portion of each half cycle. The sense of the input windings is such that the excitation field applied to the segment under one winding is equal in magnitude and opposite in sense to the excitation field applied to the strip segment which lies under the other input winding. The output windings are closely coupled to the input windings and are connected in series aiding to be individually responsive to the rate of change of the instantaneous flux in the associated strip segment. In the absence of an externally applied field the net affect at the output windings is zero, and no output signal will result. However, when an external magnetic field of essentially constant magnitude and sense with respect to the period of one excitation cycle is applied to the strip, the strip segment under an input winding will be saturated for a longer period of time during that half cycle where the excitation field is in the same sense as that of the external field, and for a shorter period of time when the excitation field is in the opposite sense to the external field. Consequently, the previously existing symmetrical relationship between the flux in the respective portions of the strip is destroyed and as a result a net voltage is induced in the serially connected output windings. The voltage thus induced is a time-varying signal having a fundamental frequency which is twice the excitation frequency and varying in amplitude in proportion to the magnitude of the external magnetic field within the range of measurement of the magnetometer.

Various problems have existed heretofore with respect to flux gate magnetometers. In many uses, for example in mining or in various vehicle detection systems, the device must be basically rugged in form. On the other hand, a magnetometer must be extremely sensitive to magnetic fields of low intensity to be of any real use. As might be expected, the desired sensitivity requires a delicacy in instrumentation which is basically incompatible with physical indestructibility. For example, it has ben found desirable in obtaining the requisite sensitivity to utilize a core comprising a strip of saturable material of extremely thin cross-section. Not only is such a core itself of a delicate nature, but after annealing to obtain the proper magnetic properties, any bending or other strain to the core may cause deterioration of the desired magnetic properties.

In addition to the above-mentioned considerations, the power requirements for the operation of a magnetometer should be minimized. Power loss may be reduced, thus lessening the power requirement, by maintaining resistive loss in the input or excitation coils at a minimum. This may be realized by maintaining the diameter of the input coils small in order to minimize the length of the wire wound in the coil. Since the input coils normally surround the sensing core, this requirement further restricts the size of core which may be utilized. It is therefore apparent that indestructibility and minimum size are of primary importance in a useful flux gate magnetometer sensing element.

Accordingly, it is a general object of this inventon to provde an improved flux gate magnetometer.

Another object of this invention is to provide a flux gate magnetometer having a high degree of sensitivity.

A further object of this invention is to provide a flux gate magnetometer having a sensing element of small physical size with the ability to withstand substantial physical shocks.

An additional object of this invention is to provide a magnetometer capable of furnishing an optimum output signal in response to a low power input signal.

Yet another object of this invention is to provide a unique method of manufacturing a small, sensitive and rugged magnetometer sensing element having low power requirements.

The foregoing objects are accomplished in accordance with the invention by a flux gate magnetometer comprising a single strip of saturable magnetic material of extremely small dimensions which is positioned against the inner surface of the bore of a cylinder of low conductivity material. The cylinder functions as a strong protective container for the core strip as well as a base for the input and output windings which may be affixed about its exterior surface and spaced symmetrically along the strip.

A magnetometer in accordance with the invention may be operated in response to an input signal of a frequency adapted to provide a maximum signal output for a minimum power input. Furthermore, the input windings may be tuned by a parallel capacitor to the desired frequency to optimize power utilization by presenting a high impedance at the input terminals, thereby to reduce input conductor power loss over long lines.

The objective of simplicity, high sensitivity and mechanical ruggedness are obtained in the device of the present invention wherein a core strip is inserted in snug contact with the interior of the bore of the cylinder before annealing is accomplished. The composite structure of core strip and supporting cylinder may then be placed in an annealing atmosphere to improve the magnetic properties of the core strip, after which the ends of the bore may be sealed. In this manner, the core strip need not be repositioned, bent or strained during further fabrication or operation; and neither the magnetic nor the physical properties thereof are distorted in any way during the manufacture. The result is that an extremely sensitive, yet rugged, magnetometer is realized.

These and other objects, advantages and features of this invention will be more clearly understood from the following detailed description taken together with the drawings in which like elements are indicated by like reference characters and in which:

FIGURE 1 is a perspective view of a sensing element in accordance with the invention including a ceramic cylinder having a helically-wound saturable core strip and associated windings;

FIG. 2 is a cross-sectional view of the element shown in FIG. 1 taken along the line 2—2;

FIG. 3 is a partly broken away view of another embodiment of the invention including a rolled core strip;

FIG. 4 is a schematic representation of a circuit arrangement including the magnetometer element shown in FIG. 1 for detecting ambient magnetic fields;

Figure 5:
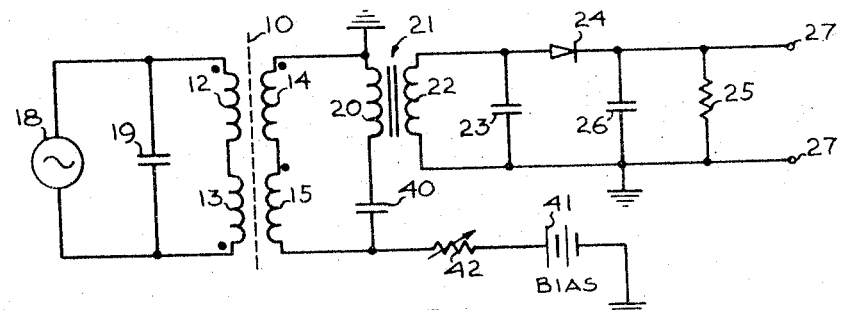
FIG. 5 is a schematic representation of a circuit arrangement to be used with the sensing element shown in FIG. 1 including means for rendering the magnetometer sensitive to field direction.
Figure 6:
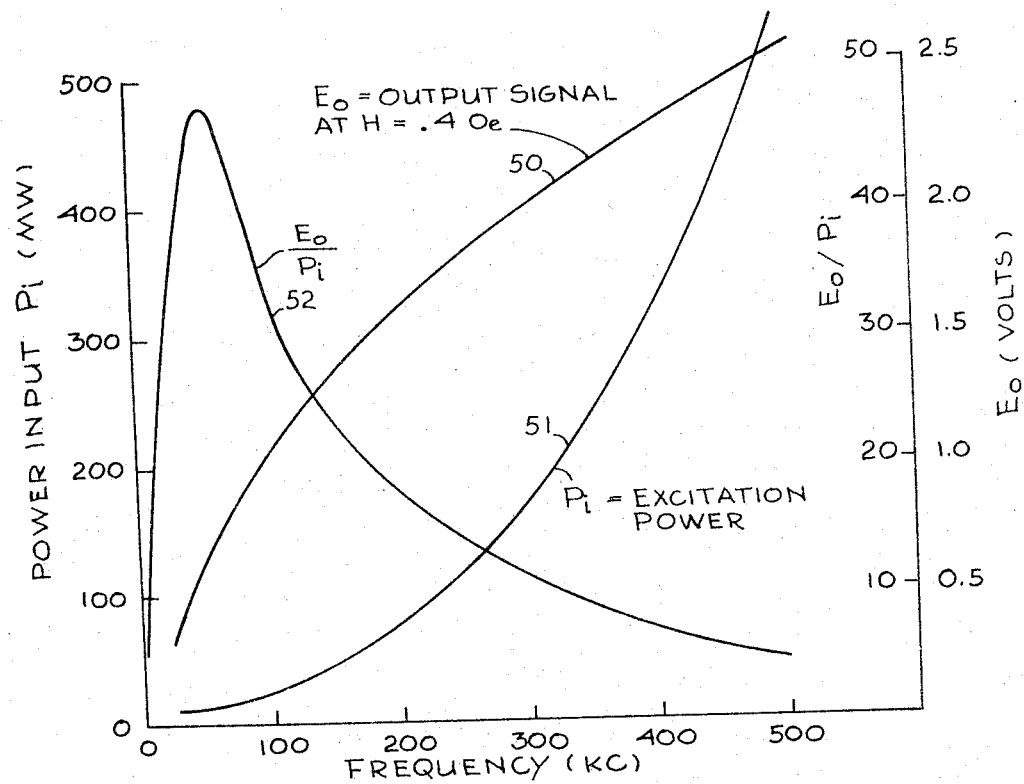
Figure 7:
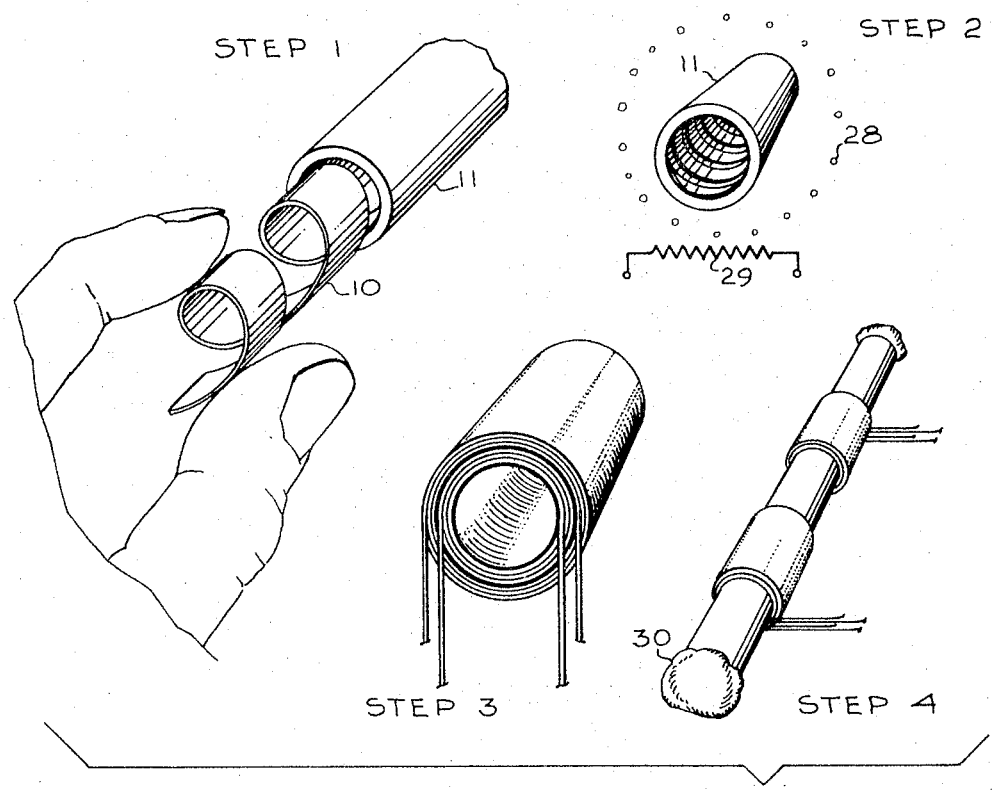
Figure 8:
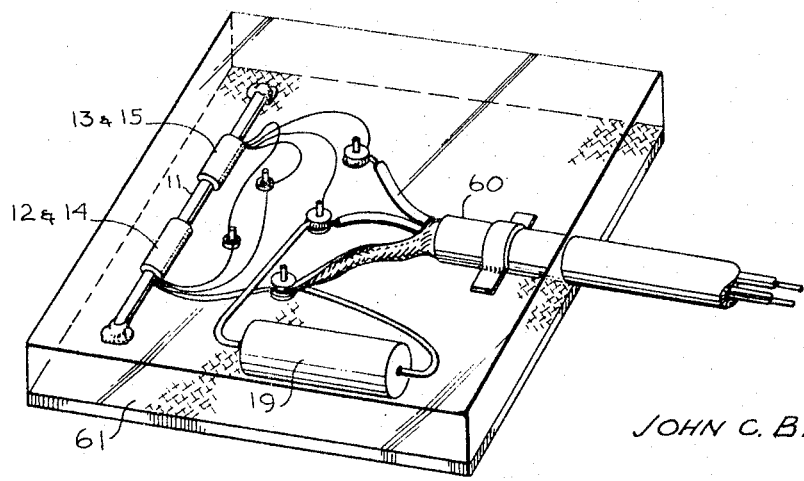

FIG. 6 graphically illustrates the input power versus output signal and frequency characteristics of the circuits of FIGS. 4 and 5;

FIG. 7 illustrates the steps of a process for manufacturing a sensing element in accordance with the invention; and FIG. 8 is a perspective view of an encapsulated sensing element and associated circuitry manufactured in accordance with the process of FIG. 7.

There is shown in FIG. 1 a perspective view of a preferred embodiment of the invention. A helically-wound strip 10 is positioned within and fitted against the inner bore of a hollow cylinder 11. The strip 10 may be inserted within the bore of the cylinder 11 by various well-known handling techniques. The helical configuration is chosen because it provides a maximum length of saturable material for the available surface within the bore. Further, it allows a minimum-thickness core to lie immediately adjacent the associated input and output windings, thus providing improved coupling. It should be noted that the strip 10 automatically positions itself within the bore against the inner surface thereof because of its resiliency. It should also be understood that the strip 10 may be rolled to a configuration resembling a long cylinder having a slit extending along its entire length and inserted in the bore. However, the helical form is preferred for its additional flux path length and minimal cross-section. The helical configuration of the strip 10 is better illustrated in the sectional view of FIG. 2 while the alternative rolled configuration is illustrated in the partly broken away view of FIG. 3.

The strip 10 may comprise any one of a number of well-known high permeability, saturable magnetic materials. For example, the strip 10 may typically comprise an alloy No. 4–79 of molybdenum permalloy having cross-sectional dimensions of 0.001 inch by 0.062 inch.

The cylinder 11 is formed of a material having a relatively high electrical resistivity and a permeability much lower than the material of which the strip is made, such as a ceramic or a ferrite material, for example. It has been found advantageous in a preferred embodiment of the invention to utilize a ceramic tubing which will withstand temperatures of up to 2500° F. without loss of physical strength and without emitting deleterious contaminants. The high temperature capability of the ceramic tubing offers distinct advantages in the annealing process employed to obtain appropriate magnetic properties for the magnetometer sensing element.

Various other materials may be utilized in place of ceramic material in the construction of the cylinder 11. For example, various low permeability metals such as stainless steel may be used in constructing the cylinder 11, providing the metal cylinder is slit to prevent it from acting as a shorted transformer turn. However, in such a case, there is a fair probability that the strip 10 may bond to the metal during the annealing process. Thus, in situations where it may be desirable to remove the annealed strip 10 from the cylinder 11 (for example, in a particular mounting situation), the ceramic material should be utilized. It is to be understood that though the ceramic material is preferred generally for economic reasons, other forms of low permeability material offer no substantial disadvantage in the usual situation as long as the ratio of strip-to-cylinder permeabilities is high.

As illustrated in FIG. 1, a first input winding 12 and a second oppositely-wound input winding 13 are serially connected and wound about the exterior of the cylinder 11 at conveniently displaced positions such that opposed magnetic flux may be induced within different segments of the strip 10. It is to be noted that the strip 10 is, in effect, a bar of saturable core material forming an incomplete magnetic path. Since the magnetic path is completed via the surrounding air, different segments of the core may have flux directed in opposite senses.

A first output winding 14 and a second output winding 15 are also wound about the exterior of the cylinder 11 in a manner to individually monitor the time rate of change of flux in the two segments of the strip 10. The output windings 14 and 15 may advantageously be connected in series and wound in a like direction. As is clearly illustrated in FIG. 2, the input or excitation windings 12 and 13 may be wound upon the output windings 14 and 15 which in turn are wound directly on the cylinder 11. In the arrangement shown in FIG. 1, the terminals 16 are arranged to allow the connection of a source of excitation signals for driving the magnetometer sensing element while the terminals 17 are adapted to permit connection of the windings 14 and 15 to an output arrangement for utilizing the signals thus produced.

There is shown in FIG. 4 a magnetometer circuit employing the sensing element illustrated in FIG. 1. The saturable magnetic core strip 10 is arranged to receive alternating-current excitation signals from a source 18 via the input windings 12 and 13 which are connected in series and oppositely wound. The source 18 of alternating current may be of any well-known type such as an oscillator circuit. A capacitor 19 is connected in shunt with the windings 12 and 13 and has a value of capacitance advantageously chosen to provide a tuned circuit at the frequency of the signal provided by the source 18. The tuned circuit provides a high input impedance and reduces power loss over long input lines, as well as enhancing the signal applied to the input windings 12 and 13. The output windings 14 and 15 are wound in like directions and are connected in series with a primary winding 20 of an output transformer 21.

In the absence of an ambient magnetic field, the input signals received from the source 18 drive the strip 10 in a manner explained above to produce a net output signal of zero at the transformer 21. On the other hand, where an external magnetic field exists, the input signals drive the strip 10 to produce a pulsating signal of twice the excitation frequency at the winding 20 of the transformer 21. This pulsating signal varies in magnitude in proportion to the external magnetic field strength and thus serves to indicate both the presence and magnitude of an ambient magnetic field.

In the circuit shown in FIG. 4, the pulsating signal appearing at the primary winding 20 of the output transformer 21 is transferred to a secondary winding 22. The output circuit including the winding 22 may be tuned to twice the frequency of the signal furnished by the source 18 by means of a capacitor 23 of suitable value which serves to reshape the pulsating signal into a sinusoidal output signal of alternating current. A diode 24, a resistive load 25 and a filter capacitor 26 together function as an amplitude detector to produce at a pair of output terminals 27 a time-varying unidirectional signal corresponding to the applied, or ambient, magnetic field. It is obvious that the output signal realized across the terminals of the winding 22 may be applied to additional arrangements adapted to respond to magnetic fields of specified magnitudes.

Referring to FIG. 5, there is shown a second circuit utilizing the magnetometer of this invention adapted either to make the magnetometer more sensitive to external field changes of one sense or to provide a means of sensing the field direction. In the circuit an excitation source 18 provides alternating-current excitation signals via windings 12 and 13 to a core strip 10. A capacitor 19 is connected in shunt with the windings 12 and 13 for tuning the arrangement to the frequency of the signals provided by the source 18. Output signals from the core strip 10 are taken across series-connected, like-wound windings 14 and 15 and transferred to an output transformer 21 in the same manner as in FIG. 4. A source of bias potential 41 is connected by a variable resistor 42 for biasing the windings 14, 15; and a capacitor 40 isolates the winding 20 from direct current. The circuit including the secondary winding 22 is arranged as in FIG. 4, the capacitor 23 accomplishing tuning and the combination including the diode 24 and the capacitor 26 functioning with the resistive load 25 as an amplitude detector. The bias from the source 41 is selected by means of the resistor 42 to maintain the strip 10 in a magnetic condition such that ambient fields of a first sense will provide increased output signals while ambient fields of the opposite sense will provide decreased output signals. By providing a suitable amplitude level sensor across the terminals 27, the sense of the ambient field may be detected.

As pointed out hereinbefore, a minimization of input power is desirable in the design of a useful magnetometer. It has been determined that above certain frequencies power loss in the core material becomes a significant factor in power consumption. FIG. 6 illustrates the manner in which the arrangements may be optimized in accordance with the invention for maximum output signal with minimum excitation power by careful selection of the excitation frequency. In FIG. 6 the magnitude of the output signal is plotted as a function of frequency in curve 50, the excitation power requirement is plotted as a function of frequency in curve 51, and the relationship $E_o/P_i$ representing the output signal divided by the excitation power is plotted as a function of frequency in curve 52. From curve 51 it may be observed that the power required to obtain adequate excitation for the specific core tested begins to increase substantially as the frequency is increased above 60 kilocycles. This indicates that core loss in the strip material is becoming a significant source of power consumption. At lower frequencies the loss is mainly due to the alternating-current resistance of the excitation coils. On the other hand, from curve 50 it may be seen that the output signal $E_o$ (at a given value of external field) increases fairly linearly with frequency up to about 100 kilocycles excitation frequency and then somewhat less rapidly at higher frequencies. The ratio of output signal (at a given value of external field) to excitation power input requirements, $E_o/P_i$ (curve 52), shows a sharp maximum in the vicinity of an excitation frequency of 60 kilocycles. This represents an optimum frequency which can be raised or lowered within limits by varying the thickness of the strip material. For a selected sensing element and a frequency determined as set forth above, the excitation and signal windings may be readily selected for optimum performance. The result is that there is provided a flux gate magnetometer sensor which is particularly useful for sensing purposes and which requires a minimum amount of operating power, yet provides a substantial output signal.

In FIG. 7 there is illustrated a process of manufacturing the sensing element of the magnetometer of this invention. Manufacture is accomplished as shown in Step 1 by inserting the saturable strip 10 within the bore of a cylinder 11 and positioning it therein in the desired position. In Step 2 the cylinder and the strip core wound therein are annealed in a hydrogen atmosphere 28 to obtain standard high-permeability annealing. For example, annealing might be accomplished by heating such as with heating element 29 at a temperature of 2100° F. for a period of approximately one hour and then cooling slowly at a rate of approximately 100° per hour. The use of a cylinder having an extremely high melting point will be appreciated. In Step 3 the cylinder and the annealed strip are removed from the annealing furnace and the input and output coils which have been prewound on an appropriate arbor are slipped over the cylinder and, after positioning, are cemented to the cylinder. The ends of the cylinder may then be closed, in Step 4, by impregnating in a well-known manner with a selected sealing compound 30, such as Silastic. Thereafter the magnetometer sensing element may have input and output connections made thereto and the entire unit cast in a material such as an epoxy resin for rendering the whole structure substantially indestructible. It should be noted that only where the core strip 10 is protected (as by the cylinder 11 with its sealed ends) may the magnetometer be rendered indestructible by casting, for only in this manner is the strip 10 maintained insensitive to stresses in the epoxy resin.

Referring to Fig. 8 there is shown a device manufactured by the aforementioned method which may be used for example, as a traffic sensing device in a manner outlined in my co-pending patent application, referred to hereinabove. The core strip is positioned within the ceramic tubing 11 with the windings 12, 13, 14 and 15 thereon. A capacitor 19 is also connected as shown. Leads are connected via the cable 60. The whole of the arrangement is mounted upon a mounting block 61 and may advantageously be cast in a suitable material such as a ceramic or plastic thereby to render the structure substantially indestructible for normal use.

It will be understood that the operation of the strip core magnetometer does not require a physically symmetrical arrangement of the type shown. As long as the magnetic symmetry of the effected segments of the strip is maintained, the shape of the strip and its protective housing may vary.

Although a particular magnetometer, circuits therefor and a method of manufacture have been disclosed above by way of example of the manner in which various aspects of the invention may be used to advantage, it will be appreciated that the invention is not limited thereto. Accordingly, any and all modifications, alterations or equivalent arrangements falling within the scope of the following claims should be considered to be a part of the invention.

The embodiments of the invention in which an exclusive property or privilege is claimed are defined as follows:

1. In a method of manufacturing a flux gate magnetometer sensing element the improvement comprising the steps of:

forming a thin elongated strip of magnetically saturable material into a resilient helix having a plurality of turns, all of substantially equal diameter and less than a predetermined dimension;

disposing said helix within the bore of a hollow cylinder of non-magnetic material having an inner diameter equal to said predetermined dimension and permitting said helix to expand to thereby enable each of said plurality of turns to resiliently bear outwardly against the inner wall of said cylinder; and exposing said cylinder and helix therein to temperatures sufficient to anneal the material of said helix.

2. The method of claim 1 including the additional step of closing the ends of said cylinder.

3. The method of claim 1 wherein said step of exposing said cylinder and helix to temperatures sufficient to anneal is performed in an oxygen free atmosphere.

4. The method of claim 1 including the steps of:

positioning a first pair of oppositely wound windings about the exterior of said cylinder at spaced intervals thereon; and positioning a second pair of identically wound windings respectively about the individual windings of said first pair.

5. The method of claim 4 including the additional step of sealing said cylinder and windings within a casting material.

References Cited

UNITED STATES PATENTS

| | | | |
|---|---|---|---|
| 3,154,769 | 10/1964 | Blades | 340—174 |
| 1,775,880 | 9/1930 | Whitlock | 336—181 X |
| 2,606,229 | 8/1952 | Brewer et al. | 324—43 X |
| 2,811,690 | 10/1957 | Sargent | 324—43 X |
| 2,743,415 | 4/1956 | Williams et al. | |
| 2,981,885 | 4/1961 | Schonstedt | 324—43 |
| 3,068,437 | 12/1962 | Jones | 29—605 X |
| 3,127,559 | 3/1964 | Legg et al. | 324—43 |

FOREIGN PATENTS 1,007,043    4/1952    France.

JOHN F. CAMPBELL, Primary Examiner.

ROBERT W. CHURCH, Assistant Examiner.

U.S. Cl. X.R.

29—605, 627; 148—121; 264—272; 324—43; 335—297; 336—180, 181